US007008096B1

(12) United States Patent
Coushaine et al.

(10) Patent No.: US 7,008,096 B1
(45) Date of Patent: Mar. 7, 2006

(54) COLORED HEADLAMP

(75) Inventors: Charles M. Coushaine, Rindge, NH (US); Thomas Tessnow, Weare, NH (US); Bradlay Ernest, Hooksett, NH (US); Daniel D. Devir, Sutton, NH (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/064,239

(22) Filed: Feb. 23, 2005

(51) Int. Cl.
*G02B 6/00* (2006.01)

(52) U.S. Cl. ....................... 362/545; 362/228; 362/551

(58) Field of Classification Search ................ 362/184, 362/228, 229, 231, 511, 540, 543, 544, 545, 362/554, 555, 800, 551

See application file for complete search history.

(56) References Cited

U.S. PATENT DOCUMENTS

| | | | | |
|---|---|---|---|---|
| 2,041,189 | A * | 5/1936 | Keating et al. | 362/228 |
| 2,123,408 | A * | 7/1938 | Ebrite | 362/551 |
| 4,464,705 | A * | 8/1984 | Horowitz | 362/554 |
| 5,685,637 | A * | 11/1997 | Chapman et al. | 362/800 |
| 6,280,049 | B1 * | 8/2001 | Tam | 362/228 |
| 6,948,830 | B1 * | 9/2005 | Petrick | 362/229 |

* cited by examiner

*Primary Examiner*—Y. My Quach-Lee
(74) *Attorney, Agent, or Firm*—William E. Meyer

(57) ABSTRACT

A vehicle headlamp (10) has a first light source (12) for illuminating an area forward of the light source (12). The first light source (12) is preferably a filamented tungsten halogen capsule. The first light source (12) is arrayed along a longitudinal axis (14) and emits substantially white light. A second light source (16) in the form of a plurality of light emitting diodes is arrayed about the first light source (12), and the second light source (16) emits light in directions substantially normal to the longitudinal axis (14), for example, along an axis (16*a*) for providing essentially aesthetic illumination. The aesthetic illumination can be used with or without the first light source being illuminated.

2 Claims, 2 Drawing Sheets

COLORED HEADLAMP

TECHNICAL FIELD

This invention relates generally to light sources and more particularly to vehicle headlamps. Still more particularly, it relates to such headlamps employing different light emitters for achieving both functional illumination and particular aesthetic effects.

BACKGROUND ART

It has been proposed to use solid-state light sources, such as light emitting diodes, as illumination units for vehicle lamps. These light sources have an advantage over more conventional light sources because of their small size and long life; however, the amount of light available from any single unit is small, thus requiring many units to provide an adequate source of illumination, with a concomitant increase in cost. Therefore, it would be an advance in the art to utilize the aesthetic effect of light emitting diodes in conjunction with the greater illumination capabilities of more conventional light sources.

DISCLOSURE OF INVENTION

It is, therefore, an object of the invention to obviate the disadvantages of the prior art.

It is another object of the invention to enhance illumination sources.

Yet another object of the invention is a vehicle headlamp employing a first light source for illumination effects and a second light source for aesthetic effects.

These objects are accomplished, in one aspect of the invention, by the provision of a vehicle headlamp comprising: a first light source for illuminating an area forward of the light source, said first light source being arrayed along a longitudinal axis and emitting substantially white light; and a second light source arrayed about said first light source, said second light source emitting light in a direction substantially normal to said longitudinal axis in one or more colors that are selected from individual portions of the electromagnetic spectrum.

Still more particularly, a vehicle headlamp comprises: a reflector; a headlamp assembly operatively located in said reflector and comprising a socket having a first light source positioned therein, said assembly having a longitudinal axis; and a plurality of secondary light sources on said socket and arrayed about said longitudinal axis and emitting light in a direction substantially normal to the longitudinal axis and in one or more colors selected from individual color portions of the electromagnetic spectrum.

Employing the secondary light sources allows aesthetic variation in the lighting, such as by selecting the emitted color from the second light sources to match the vehicle body color. Alternatively, the second light sources can be illuminated sequentially to provide a pleasing effect when viewed from the front of the vehicle. The second light sources can also be used as daylight running lights should that effect be desired. This latter use would afford a better color selection than the choices now available.

Further, since the second light source or sources are provided directly with the first or main illumination source, replacement occurs more easily than with previous embodiments of light emitting diodes, which were typically hardwired into position.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
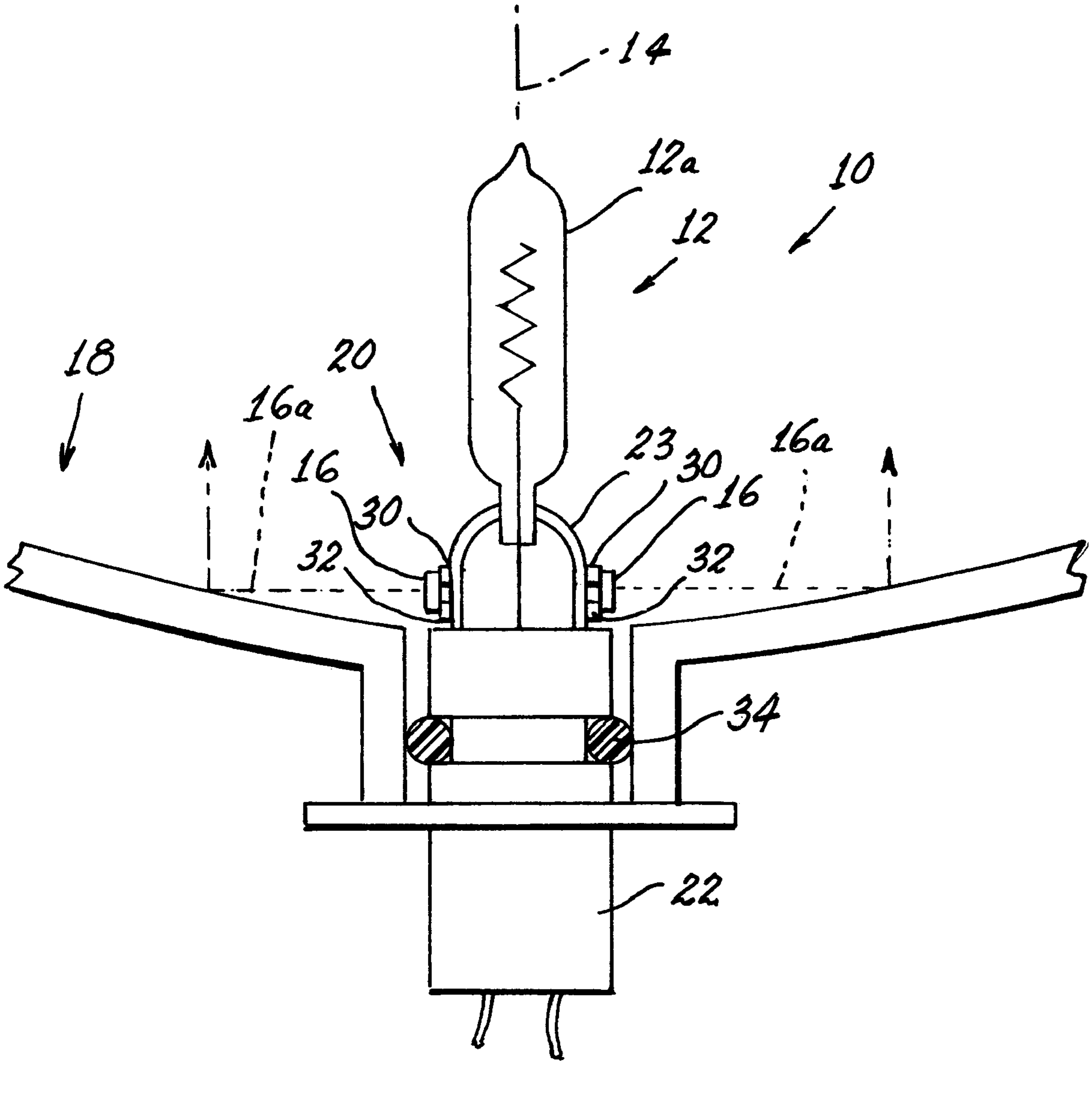
FIG. 1 is an elevational, sectional view of an embodiment of the invention.

Referring now to the drawings with greater particularity, there is shown in FIG. 1 a vehicle headlamp 10 comprising a first light source 12 having a bulb **12*a* for illuminating an area forward of the light source 12. The first light source 12 is preferably a filamented tungsten halogen capsule. The bulb 12*a* is arrayed along a longitudinal axis 14 and emits substantially white light. A second light source 16 is arrayed about the bulb 12*a*, and the second light source 16 emits light in a direction different from the first light source, for example, along an axis 16*a***.

The first light source 12 and bulb **12*a* is part of a headlamp assembly 20 that is operatively located in a reflector 18 and additionally includes a socket 22 having a retainer 23 mounted therein. Such headlamp assemblies are known in the art. Secondary light sources 16 are fixed to the socket 22, in this instance by being operatively attached to the retainer 23, and are arrayed about the longitudinal axis 14. The secondary light sources 16 in this instance are light emitting diodes and they can be chosen to emit in a single color or in multiple colors, for example, red, green and blue, or in any blend of these colors. Electrical connection can be supplied to the diodes by mounting the diodes between two electrically conductive strips 30, 32, as shown in FIG. 1**. By selecting in advance the colors to be emitted, the reflector can be given a unique glow to provide a desired aesthetic effect, such as matching a vehicle's body color. Also, the diodes could be selected to provide white light emission and energized to provide daytime running lights as a more energy efficient alternative to operating a conventional headlamp at a low power setting or simply to be illuminated when the first light source is not illuminated at all, thus providing a more brilliant, less washed-out appearance.

Alternatively, electrical coupling to the second light source can be provided from the same connections the first light source or they can be provided through alternate second connections.

The headlamp assembly 20 can be positioned in the reflector 18 by any suitable means, such as screw threads, bayonet fittings or flange and groove mounting, all of which have been employed in the past. A gasket 34 can also be used to provide an environmental seal.

Figure 2:
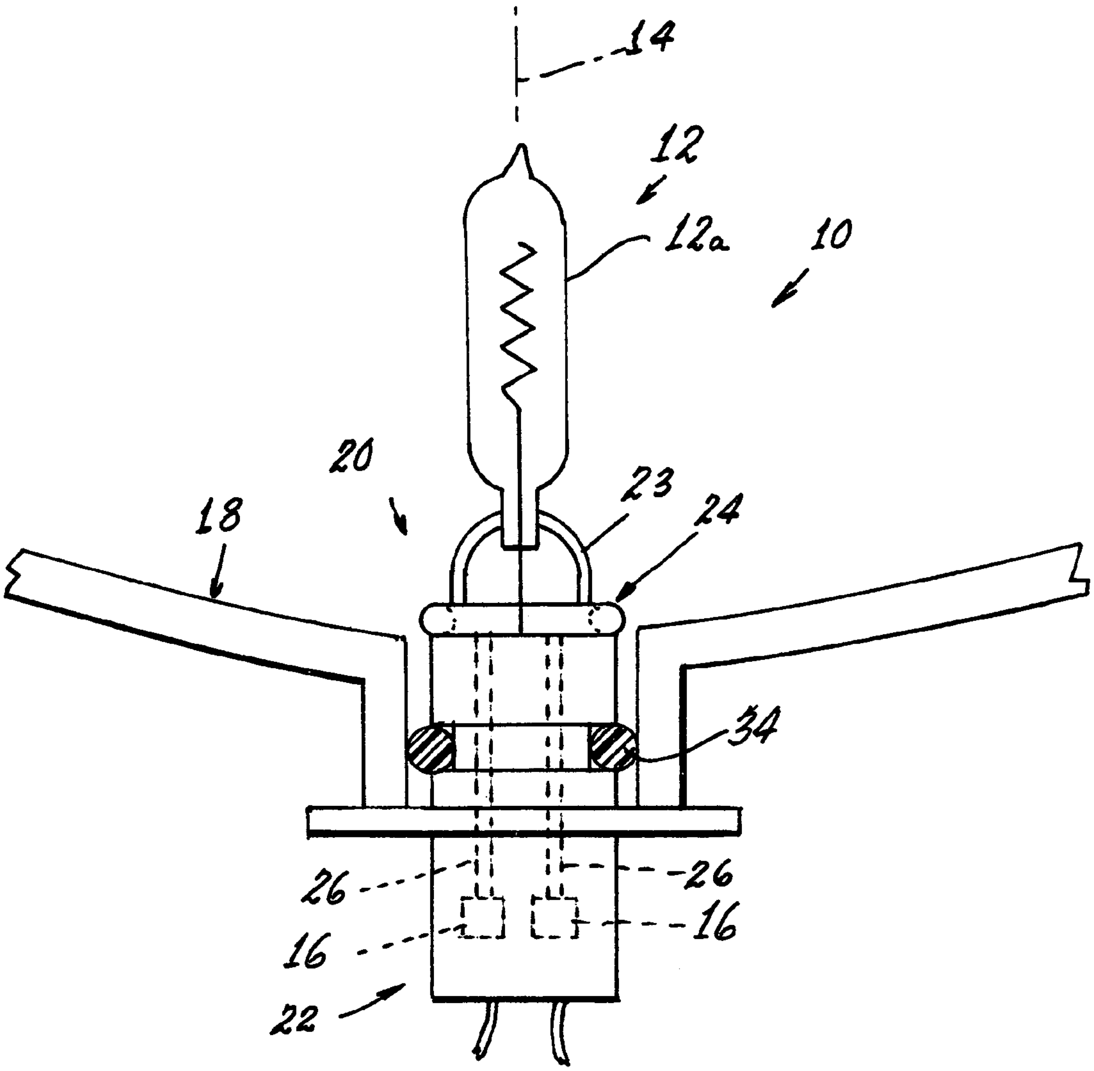
FIG. 2 is a similar view of an alternate embodiment of the invention.

An alternate embodiment is shown in FIG. 2 wherein the aesthetic lighting is provided by embedding one or more of the diodes 16 within the socket 22 and directing the light emitted therefrom through light pipes 26 to a light transmitting light guide, such as an optic ring 24 that surrounds the retainer 23.

Again, the number and colors of the light emitting diodes can be chosen to provide any of multiple effects. If desired, the light emitting diodes can be provided with an independent battery source of power, such as from nickel-cadmium batteries, which can be charged and re-charged when the road-illuminating portion of the headlamp, i.e., first light source 12, is energized.

Thus there is provided a plural light source having true illumination capabilities together with aesthetic lighting capabilities. The light source is compact, convenient and easily replaceable.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A vehicle headlamp comprising:

a reflector;

a headlamp assembly operatively located in said reflector and comprising a socket including a lamp retainer having a lamp capsule positioned therein, said assembly having a longitudinal axis;

a light transmitting light guide positioned about said retainer;

at least one light emitting diode fixed in said socket; and at least one light pipe fixed in said socket, said light pipe optically coupling light from said light emitting diode to said light transmitting light guide.

2. The vehicle headlamp of claim 1 wherein said lamp capsule is a filamented tungsten halogen bulb.

* * * * *